United States Patent
Kinoshita et al.

[11] Patent Number: 6,057,754
[45] Date of Patent: May 2, 2000

[54] DRIVE ASSIST SYSTEM FOR MOTOR VEHICLE

[75] Inventors: Masahiro Kinoshita; Atsushi Ikeda; Kazumasa Arai, all of Tokyo, Japan

[73] Assignee: Fuji Jukogyo Kabushiki Kaisha, Tokyo, Japan

[21] Appl. No.: 09/122,773

[22] Filed: Jul. 27, 1998

[30] Foreign Application Priority Data

Aug. 11, 1997 [JP] Japan .................................. 9-216554

[51] Int. Cl.⁷ .................................................. B60Q 1/00
[52] U.S. Cl. .................... 340/435; 340/903; 340/436; 340/937; 348/148
[58] Field of Search .................... 348/135, 136, 348/137, 140, 148, 149, 142, 118, 119, 143, 175, 176, 178, 179, 190, 208, 211; 340/903, 937, 435, 436; 180/167, 169, 270

[56] References Cited

U.S. PATENT DOCUMENTS

| | | |
|---|---|---|
| 3,882,268 | 5/1975 | Ogawa et al. . |
| 5,530,771 | 6/1996 | Meakawa .............................. 382/103 |
| 5,555,555 | 9/1996 | Sato et al. .............................. 382/104 |
| 5,638,116 | 6/1997 | Shimoura et al. ....................... 348/118 |
| 5,850,254 | 12/1998 | Takano et al. ............................ 348/148 |

FOREIGN PATENT DOCUMENTS

| | | |
|---|---|---|
| 5-265547 | 10/1993 | Japan . |
| 06305384 | 11/1994 | Japan . |
| 07009927 | 1/1995 | Japan . |
| 07065296 | 3/1995 | Japan . |
| 08203000 | 8/1996 | Japan . |
| 09188206 | 7/1997 | Japan . |

*Primary Examiner*—Daryl Pope
*Attorney, Agent, or Firm*—Smith, Gambrell & Russell, LLP

[57] ABSTRACT

A drive assist system of a vehicle for preventing a lane moving-out includes a pair of CCD cameras for taking picture images of the scenery in front of the vehicle, an image processing section for processing the picture images, a road/object detecting section for obtaining image data, a lane moving-out judging section for judging a lane moving-out from a lane, a roadside judging section for issuing an alarm when it judges a lane moving-out in the roadside direction, a moving-out direction obstacle judging section for issuing an alarm when there is a possibility of colliding with an obstacle on a moving-out direction lane, a lane width judging section for stopping or suppressing an alarm in case where the lane moving-out is an avoidable behavior due to the narrow width of the lane and a front direction obstacle judging section for stopping or suppressing an alarm in case where the lane moving-out is for avoiding an obstacle in front of the vehicle.

26 Claims, 8 Drawing Sheets

DRIVE ASSIST SYSTEM FOR MOTOR VEHICLE

BACKGROUND OF THE INVENTION

1. Field of the invention

The present invention relates to a drive assist system for raising an alarm when a vehicle moves out from the lane and more particularly to a drive assist system capable of controlling the alarm according to situations.

2. Prior Arts

There is an idea of realizing a safety of a vehicle by positively assisting a driver's operation and a system introducing this idea is a so-called Active Drive Assist (ADA) System. A primary function of the ADA system is to estimate a hazard of a collision with a forward vehicle, a hazard of a contact with an object, a possibility of a moving-out from a lane of a road and the like, based on surrounding information or running conditions of a vehicle and to inform a driver of these hazardous possibilities or to activate various control devices.

There are known apparatuses employing a laser radar and the like to collect surrounding information. Further, the inventor of the present invention proposes, in Japanese Patent Application Laid-open No. Toku-Kai-Hei 5-265547, a technique in which picture images taken by cameras of the scenery in front of the vehicle are processed to recognize road and traffic conditions in the form of three-dimensional information.

A lane moving-out prevention technique which is one of the functions of the ADA system is for informing drivers of hazard by a warning device and the like, when vehicles come close to the lane marker or move out therefrom due to drivers' inadvertent behaviors such as sudden drowsiness falling on drivers or inattentive driving. Various technologies have been developed to prevent the moving-out from the lane.

However, in the real world, there are cases where drivers are required to negotiate roads crowded with pedestrians or parked vehicles and as a result, drivers often move out of lanes to avoid a contact with those pedestrians or parked vehicles.

In order to make this type of the ADA system more practicable, these drivers' intentional behaviors must be discriminated from inadvertent ones as described above to control or suppress the issuance of alarms.

With respect to the ADA system capable of reflecting drivers' intention, Japanese Patent Application Laid-open No. Toku-Kai-Hei discloses a technology wherein an alarm is raised only when the vehicle moves out from the lane without operating the turn signal lever.

However, drivers not always move out from the lane while the turn signal lever is operated. For example, when the vehicle travels on ordinary roads, in a case where some other vehicle or an obstacle jumps out in front of the vehicle, drivers may move out from the lane without having a leeway for operating the turn signal lever. According to the prior art, in such a case, an alarm is raised in the same manner regardless of drivers' intention.

Therefore, in order to make the ADA system more usable, it is required that the warning device of the ADA system is stopped or suppressed (for example, in case of a sound-based warning device, reduce the sound level, change the tone of the sound, stop the sound and the like) according the necessity of the warning.

SUMMARY OF THE INVENTION

It is an object of the present invention to provide a drive assist system capable of stopping or suppressing an alarm in case of an intentional lane moving-out.

To achieve the above object, the drive assist system according to a first aspect of the present invention comprises:

a running environment detecting means for detecting running conditions of said self vehicle, a position of a self vehicle, a position of a self lane and a position of a neighboring lane and for recognizing objects existing on the self lane and the neighboring lane in the relationship with the position of the self vehicle;

a lane moving-out judging means based on information obtained from the running environment detecting means for comparing the position of the self vehicle with the position of the self lane and for judging a lane moving-out from the self lane of the self vehicle;

a warning signal generation judging means for outputting a signal to raise an alarm when the self vehicle moves out from the self lane when the self vehicle moves out from the self lane and at least when it is judged based on the information obtained from the running environment judging means that the neighboring lane does not exist in the direction of moving out; and a warning control means for operating an warning device based on the signal from the warning signal generation judging means.

Further, according to a second aspect of the present invention, the drive assist system comprises:

a running environment detecting means for detecting running conditions of said self vehicle, a position of a self vehicle, a position of a self lane and a position of a neighboring lane and for recognizing objects existing on the self lane and the neighboring lane in the relationship with the position of the self vehicle;

a lane moving-out judging means based on information obtained from the running environment detecting means for comparing the position of the self vehicle with the position of the self lane and for judging a lane moving-out from the self lane of the self vehicle;

a warning signal generation judging means for outputting a signal to raise an alarm when the self vehicle moves out from the self lane in the direction of a neighboring lane of the self lane and at least when it is judged based on the information obtained from the running environment judging section that an object exists on the neighboring lane and that the object is an obstacle to the self vehicle; and a warning control means for operating an warning device based on the signal from the warning signal generation judging means.

Further, according to a third aspect of the present invention, the drive assist system comprises:

a running environment detecting means for detecting running conditions of said self vehicle, a position of a self vehicle, a position of a self lane and a position of a neighboring lane and for recognizing objects existing on the self lane and the neighboring lane in the relationship with the position of the self vehicle;

a lane moving-out judging means based on information obtained from the running environment detecting means for comparing the position of the self vehicle with the position of the self lane and for judging a lane moving-out from the self lane of the self vehicle;

a warning signal generation judging means for outputting a signal to stop or suppress an alarm when the self vehicle moves out from the self lane and at least when it is judged based on the information obtained from the running environment judging means that a width of the self lane is narrower than a predetermined value; and a warning control means for operating an warning device based on the signal from the warning signal generation judging means.

Furthermore, according to a fourth aspect of the present invention, the drive assist system comprises:

a running environment detecting means for detecting running conditions of said self vehicle, a position of a self vehicle, a position of a self lane and a position of a neighboring lane and for recognizing objects existing on the self lane and the neighboring lane in the relationship with the position of the self vehicle;

a lane moving-out judging means based on information obtained from the running environment detecting means for comparing the position of the self vehicle with the position of the self lane and for judging a lane moving-out from the self lane of the self vehicle;

a warning signal generation judging means for outputting a signal to stop or suppress an alarm when the self vehicle moves out from the self lane and at least when it is judged based on the information obtained from the running environment judging section that an object exists on the self lane within a preestablished range and that the object is an obstacle to the self vehicle; and a warning control means for operating an warning device based on the signal from the warning signal generation judging means.

DETAILED DESCRIPTION OF THE INVENTION

Figure 2:
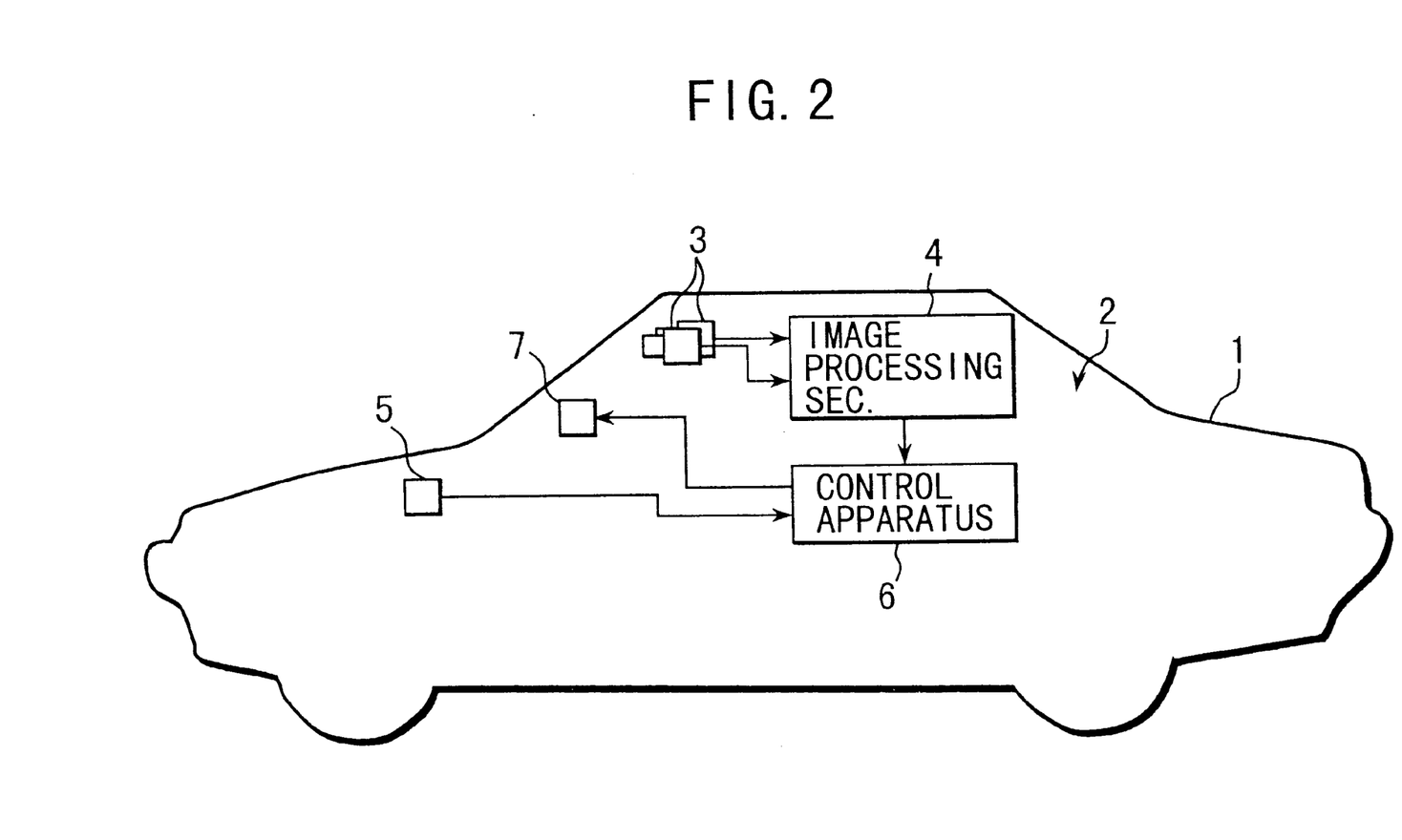
FIG. 2 is a schematic diagram of a drive assist system according to the present invention.

Referring now to FIG. 2, numeral 1 denotes a vehicle (self vehicle) on which a drive assist system 2 according to the present invention is mounted. The drive assist system 2 has a function of a lane moving-out prevention in which a warning is raised when the vehicle comes close to the lane marker of a road.

The drive assist system 2 has a pair of CCD cameras 3 disposed in the frontal portion of the passenger compartment at a specified transversal interval on the left and right sides of the vehicle 1 in order to take stereoscopic pictures of the scenery at the front of the vehicle 1 from different view points.

The CCD cameras 3 are connected with an image processing section 4 in which three-dimensional distance distribution data are formed based on pictures of the scenery taken by the CCD cameras 3. Further, the image processing section 4 is connected with a control apparatus 6 for outputting a warning signal to a warning device 7 based on the distance distribution data and a vehicle speed $v_1$ of the self vehicle when the vehicle 1 moves out of the lane marker. The vehicle speed $v_1$ is detected by a vehicle speed sensor 5 and sent to the control apparatus 6.

The image processing section 4 calculates distance information over an entire image based on the deviation amount of a corresponding position with respect to a pair of the stereoscopic pictures taken by the CCD cameras 3 according to the principle of triangulation and forms distance images presenting three-dimensional distribution based on the distance information to output these distance images to the control apparatus 6.

The control apparatus 6 is formed by a multi-microprocessor system in which necessary information is extracted from the distance images processed in the image processing section 4 and a lane moving-out prevention control is performed based on the vehicle speed $v_1$ detected by the vehicle speed sensor 5.

Figure 1:
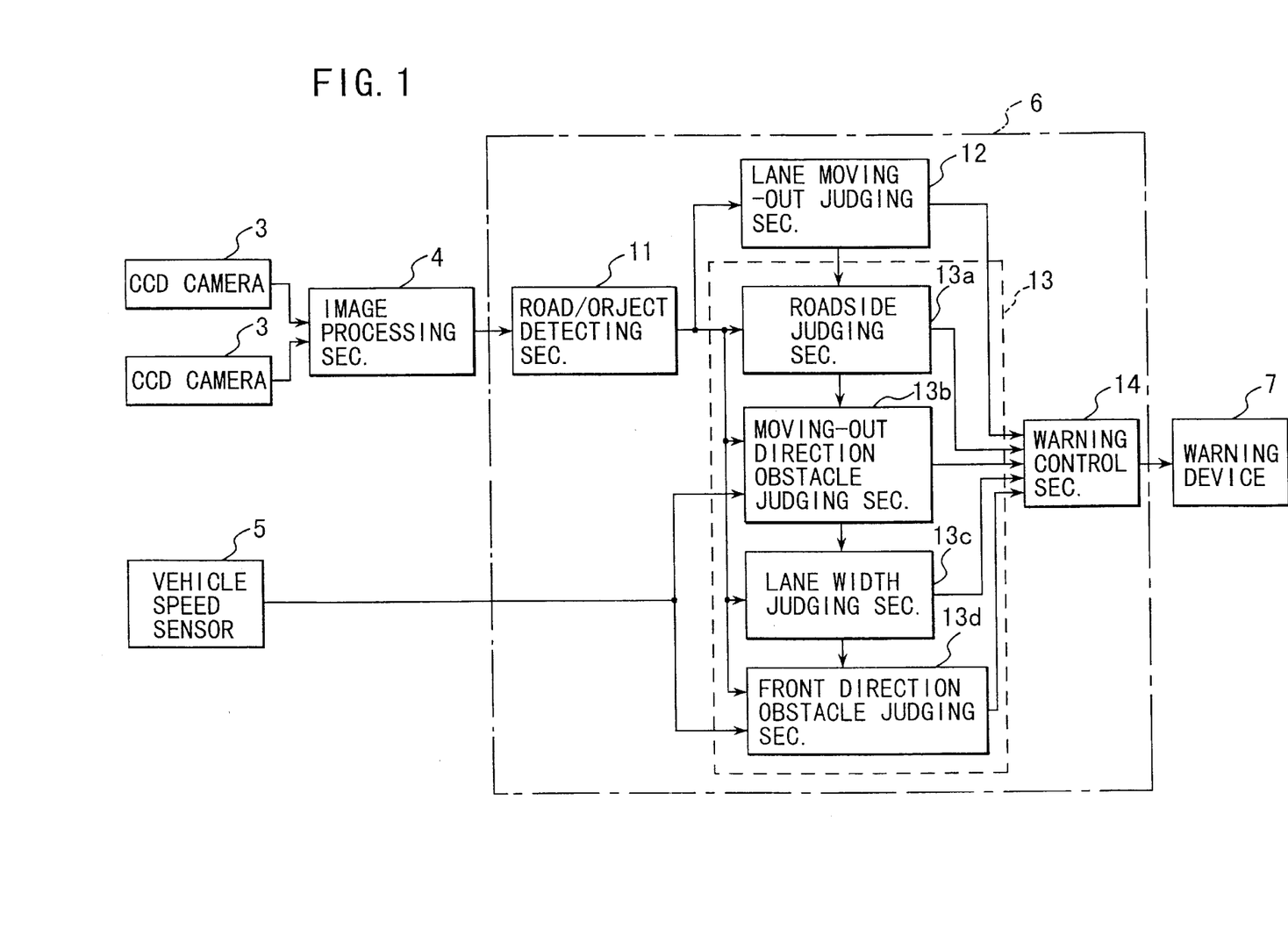
FIG. 1 is a functional block diagram of a drive assist system according to the present invention.

Further, as shown in FIG. 1, the control apparatus 6 comprises a road/object detecting section 11, a lane moving-out judging section 12, a warning signal generation judging section 13 and a warning control section 14.

Figure 3:
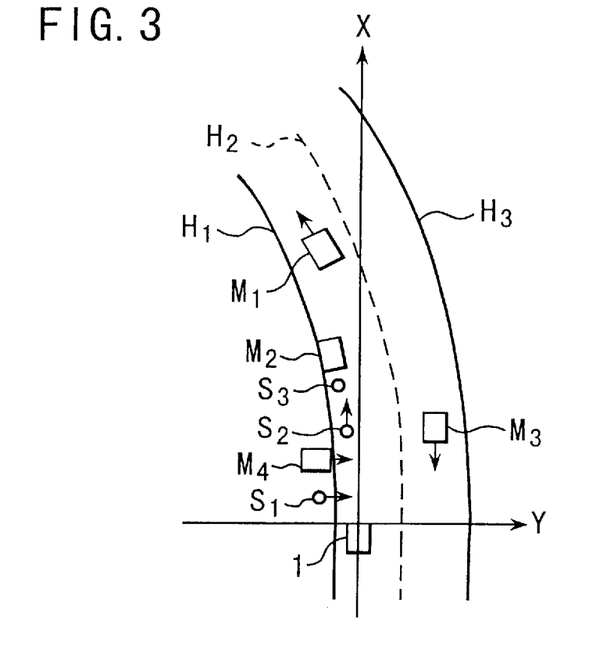
FIG. 3 is an explanatory view of data detected by a road/object detecting section.

The road/object detecting section 11 detects lane markers, other vehicles, objects other than vehicles and the like separately from the distance images inputted from the image processing section 4 and obtains the image data of the road and objects. In case of a road with two lanes as shown in FIG. 3, for example, the position and the configuration of lane markers $H_1, H_3, H_2$ (left and right ones and a center one, respectively), a preceding vehicle $M_1$ traveling on the self lane, a parked vehicle $M_2$, an oncoming vehicle $M_3$ traveling on the counter lane, a vehicle $M_4$ crossing the self lane, a pedestrian $S_1$ crossing the road, a pedestrian $S_2$ walking along the lane and the other obstacle $S_3$ are obtained based on the image data in terms of coordinates X, Y on a coordinate system composed of an X coordinate axis in the vehicle traveling direction and a Y coordinate axis which is perpendicular to the X coordinate axis X. Further, data of velocity vector for those objects $M_1, M_2, M_3, M_4, S_1, S_2$ and $S_3$ are also calculated.

Thus, a running environment detecting means is formed by the vehicle speed sensor 5, a pair of the CCD cameras 3, the image processor 4 and the road/object detecting section 11.

The lane moving-out judging section 12 serving as a lane moving-out judging section 12 receives the data from the road/object detecting section 11 and judges whether or not the vehicle 1 is moving out from the lane marker by comparing the coordinates (0, 0) showing the reference position of the vehicle 1 with either of the coordinates (0, $y_{1(n)}$) of the left-hand lane marker $H_1$ or the coordinates (0, $y_{r(n)}$) of the right-hand lane marker $H_2$.

Figure 4:
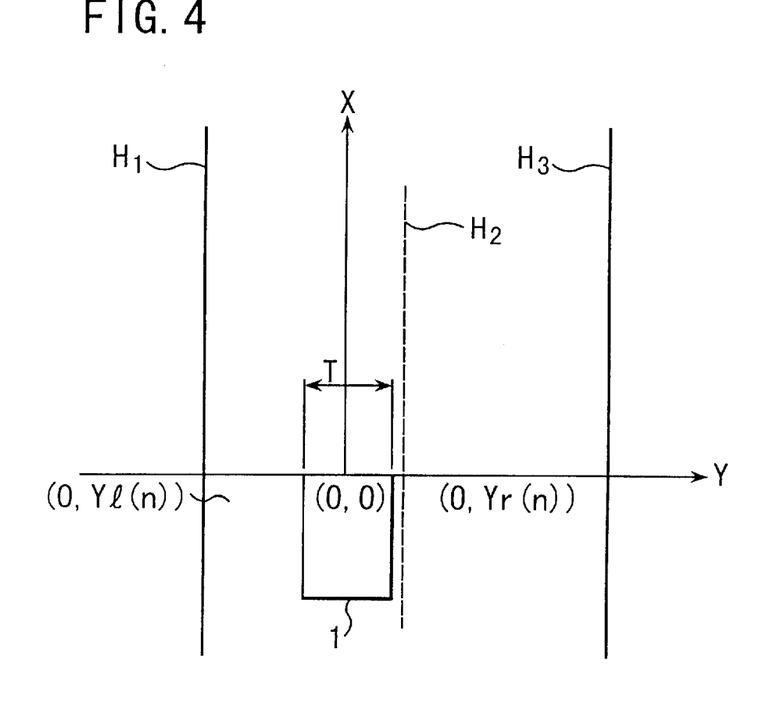
FIG. 4 is a view for explaining a judgment of a lane moving-out.

That is, for example, as shown in FIG. 4, letting the width of the vehicle 1 be T, if $y_{1(n)} \geq -T/2$, it is judged that the vehicle is moving-out from the left-hand lane marker and if $y_{r(n)} \leq T/2$, it is judged that the vehicle is moving out from the right-hand lane marker. The result of the judgment is outputted to the warning signal generation judging section 13.

The warning signal generation judging section 13 receives signals from the vehicle speed sensor 5, the road/object detecting section 11 and the lane moving-out judging section 12 and in case where the signal from the lane moving-out judging section 12 is "the vehicle is not moving out from the lane", a signal for stopping the warning is outputted to the warning control section 14. On the other hand, in case where the signal from the lane moving-out judging section 12 is "the vehicle is moving out from the lane", either a signal for raising the warning or a signal for controlling (stopping or suppressing) is outputted to the warning control section 14. Thus, the warning signal generation judging section 13 serves as a warning signal generation judging means.

Hence, the warning signal generation judging section 13 comprises a roadside judging section 13a, a moving-out direction obstacle judging section 13b, a lane width judging section 13c and a front direction obstacle judging section 13d.

The roadside judging section 13a is started to operate in response to the signal "the vehicle is moving out from the lane" of the lane moving-out judging section 12. When this roadside judging section 13a operates, based on data from the road/obstacle detecting section 11, it is judged whether or not a lane exists in the direction of "moving out". If a lane does not exist, a signal for raising an alarm is outputted to the warning control section 14. If a lane exists, the moving-out direction obstacle judging section 13b is operated. For example, in a case shown in FIG. 4, when the vehicle moves out from the lane to the right, it is judged that a lane exists and then the moving-out direction obstacle judging section 13b is started to operate. On the other hand, when the vehicle moves out from the lane to the left, it is judged that there is no lane and then a signal for raising an alarm is outputted to the warning control section 14.

The moving-out direction obstacle judging section 13b is started to operate based on the judgment "there is a lane" in the roadside judging section 13a. When the moving-out direction obstacle judging section 13b operates, based on data from the road/object detecting section 11 and data from the vehicle speed sensor 5, if an object exists on a "moving out direction" lane, it is judged whether or not the object is an obstacle to the self vehicle. If the object is an obstacle, a signal for raising an alarm is outputted to the warning control section 14 and if the object is not an obstacle, the lane width judging section 13c is started to operate.

Figure 5A:
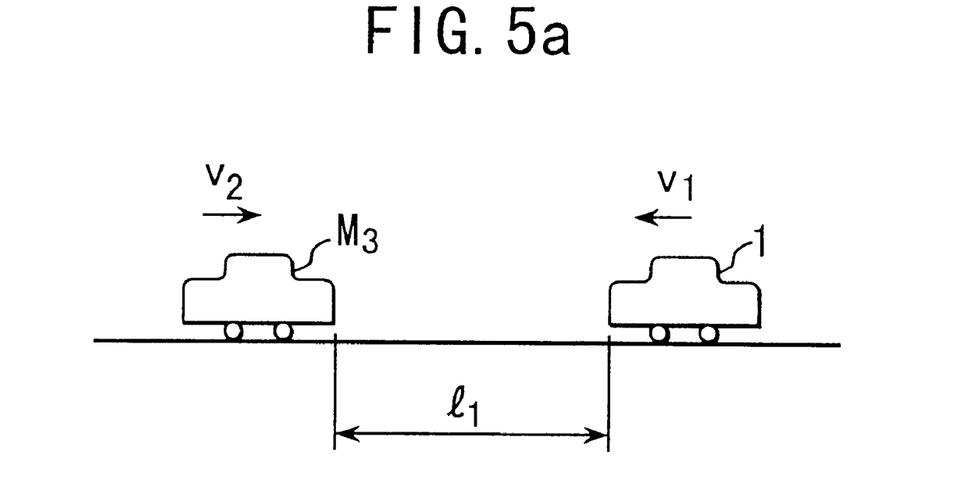
FIG. 5a is an explanatory view showing a relationship between a self vehicle and an oncoming vehicle.

The judgment whether the object is an obstacle or not is performed in the following manner for example:

Referring to FIG. 5a, in case where a distance l1 between the object and the self vehicle 1 is smaller than an obstacle judging distance $L_1=f(v_1, v_2)$, the object is judged to be an obstacle and in case where the distance l1 is larger than $L_1$, the object is judged not to be an obstacle. Herein, $v_1$ is a velocity of the self vehicle 1 and $v_2$ is a velocity of the object, that is, an oncoming vehicle or a vehicle traveling in the same direction. The obstacle judging distance $L_1=f(v_1, v_2)$ is established based on a map or a formula which is prepared by experiments or other means. For example, the obstacle judging distance $L_1=f(v_1, v_2)$ is calculated by multiplying a relative velocity $(v_1-v_2)$ by a specified constant $t_{cl}$ ($L_1=t_{cl} \cdot (v_1-v_2)$). Further, the obstacle judging distance $L_1$ may be established as a safe distance needed for avoiding a collision with the obstacle in consideration of the velocity $v_2$ of the self vehicle and the velocity $v_2$ of the obstacle.

The lane width judging section 13c is started to operate based on the judgment "there is no obstacle in the moving out direction lane" in the moving-out direction obstacle judging section 13b. When the lane width judging section 13c operates, based on data from the road/object detecting section 11, it is judged whether or not a width "B" of the self lane is broader than a predetermined width "$B_{cl}$". In case where the width "B" of the self lane is narrower than the predetermined width "$B_{cl}$", the lane moving-out is judged to be inevitable because of the narrow width of the lane and a signal for stopping or suppressing an alarm is outputted to the warning control section 14. On the other hand, in case where the width "B" of the self lane is broader than the predetermined width "$B_{cl}$", the front direction obstacle judging section 13d operates. This predetermined width "$B_{cl}$" is a value for judging a narrow road and in this embodiment the value is established to be 3.5 meters for example.

When the front direction obstacle judging section 13d operates, based on data from the road/object detecting section 11 and data from the vehicle speed sensor 5, in case where there an object (or objects) is caught within a preestablished monitoring range, it is judged whether or not this object (or objects) is an obstacle to the self vehicle. If it is judged that the object is an obstacle, a signal for stopping or suppressing an alarm is outputted to the warning control section 14 and if it is judged that the object is not an obstacle, a signal for raising an alarm is outputted to the warning control section 14.

Figure 6A:
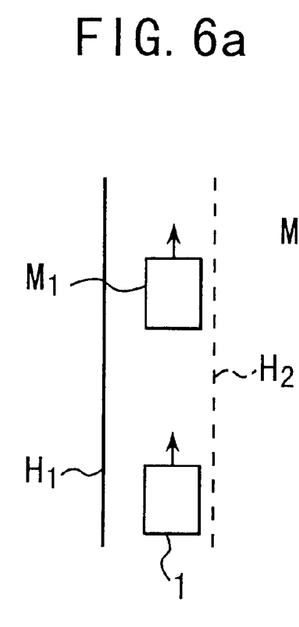
FIGS. 6a through 6e are views showing examples of various cases where there is a possibility of avoiding obstacles.
Figures 6B, 6C:
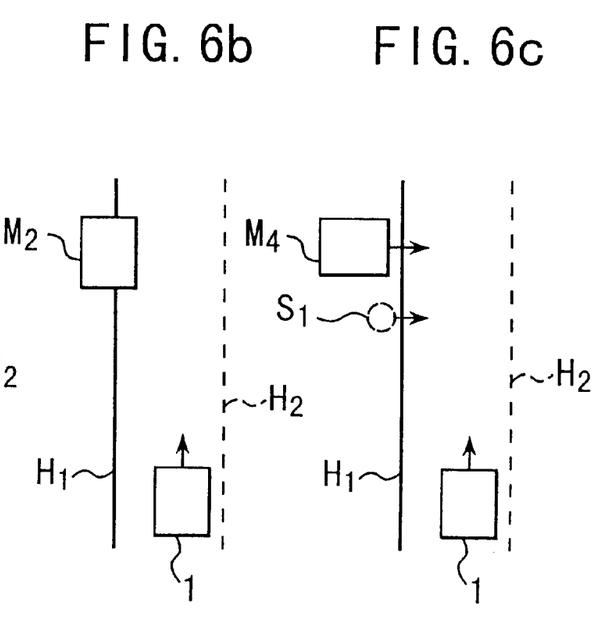
Figure 6D:
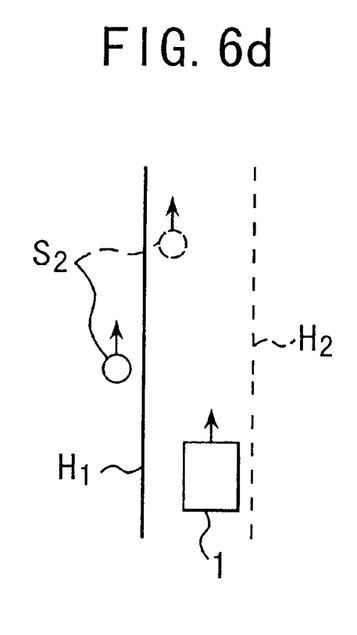
Figure 6E:
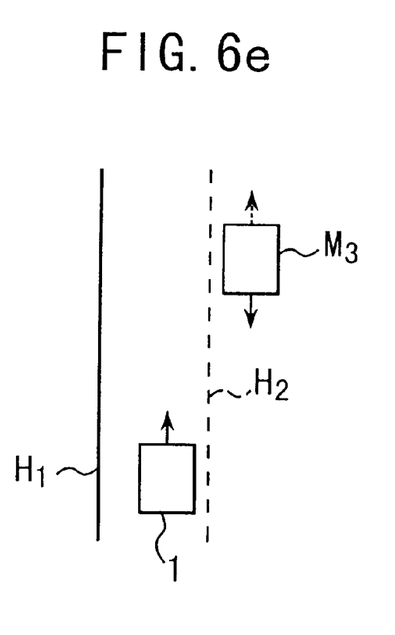
Figure 7:
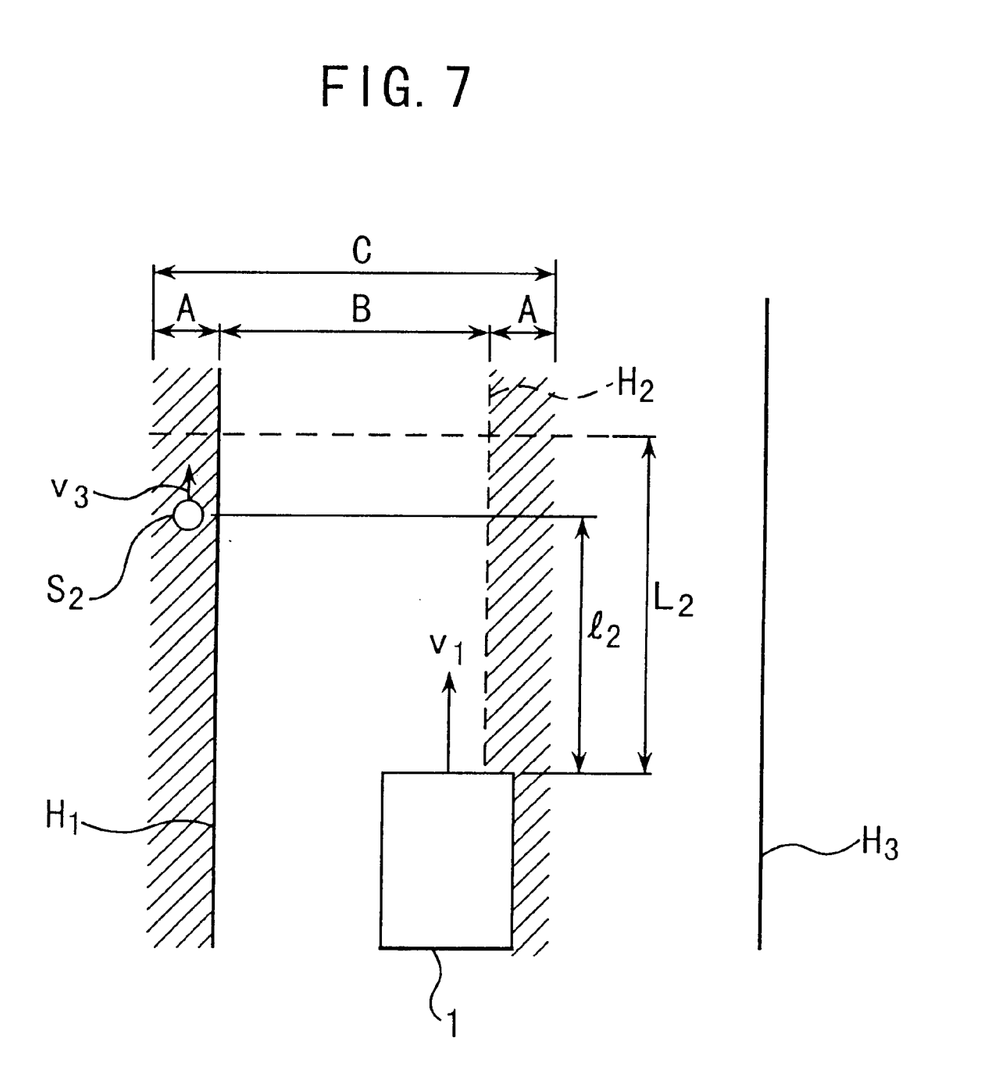
FIG. 7 is an explanatory view showing a range of detection.

Situations in which a driver is likely to take an avoidance behavior are shown in FIGS. 6a through 6e. FIG. 6a illustrates a situation wherein the vehicle has a preceding vehicle ahead or is coming close to the preceding vehicle, FIG. 6b illustrates a situation wherein the vehicle is coming close to a parked vehicle, FIG. 6c illustrates a situation wherein the vehicle encounters a jumping-out vehicle or pedestrian, FIG. 6d illustrates wherein the vehicle is coming close to a pedestrian and FIG. 6e illustrates a situation wherein the vehicle is coming close to an oncoming vehicle or a vehicle traveling ahead in the same direction. Among these situations, situations shown in FIGS. 6a and 6b can be coped with provided that the frontal scenery of the self lane is monitored. To cope with situations shown in FIGS. 6c to 6e, it is necessary to monitor both the self lane and the neighboring lane. Therefore, the preestablished monitoring range must include, as shown in FIG. 7, not only the self lane (width B) but also the left and right ranges having a width "A" (for example 0.3 meters) respectively which cover the neighboring left and right lanes. The width "A" may be a fixed value or may be a value established by a map or formula parameterizing the vehicle speed $v_1$.

Figure 5B:
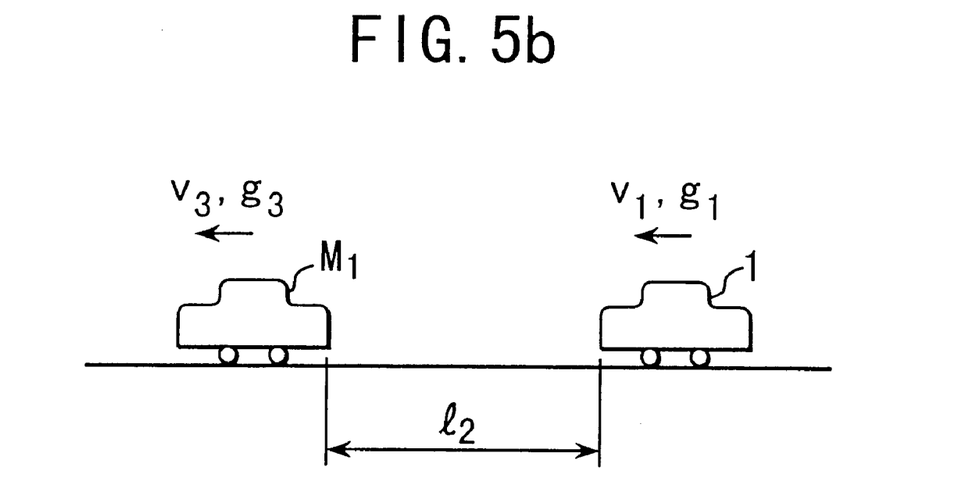
FIG. 5b is an explanatory view showing a relationship between a self vehicle and a preceding vehicle.

The judgment whether the object situated in front of the self vehicle is an obstacle or not is performed in the following manner for example:

Referring to FIG. 5b and FIG. 7, in case where a distance $l_2$ between the object and the self vehicle 1 is smaller than an obstacle judging distance $L_2=f(v_1, v_3)$, the object is judged to be an obstacle and in case where the distance $l_2$ is larger than $L_2$, the object is judged not to be an obstacle. Herein, $v_1$ is a velocity of the self vehicle 1 and $v_3$ is a velocity of the object situated in front of the self vehicle. The obstacle judging distance $L_2=f(v_1, v_3)$ is established based on a map or a formula which is prepared by experiments or other means. For example, the obstacle judging distance $L_2=f(v_1, v_3)$ is determined in proportion to a relative velocity $(v_1-v_3)$. Further, the obstacle judging distance $L_2$ may be established as a safe distance capable of avoiding a collision with that obstacle when the self vehicle applies an emergency brake. In this case, the obstacle judging distance $L_2$ is expressed as $L_2=(\frac{1}{2}) \cdot v_3^2/g_3 - (\frac{1}{2}) \cdot v_1^2/g_1$, for example, where $g_1$ is a deceleration of the self vehicle 1 and $g_3$ is a deceleration of the object ahead of the vehicle.

Thus, the warning control section 14 which serves as a warning control means operates a buzzer responsive to signals from the warning signal generation judging section 13.

Figure 8:
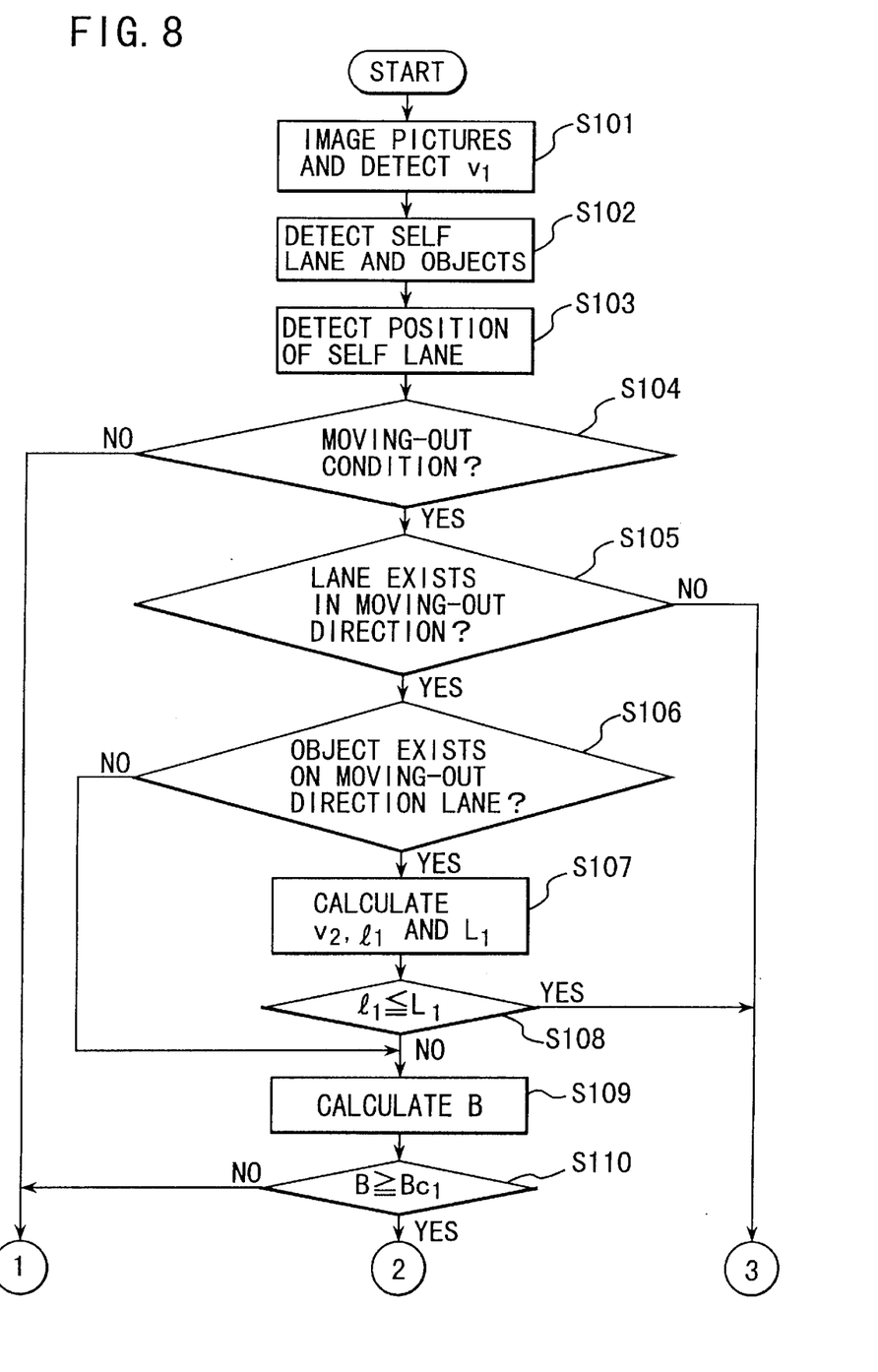
FIG. 8 is a flowchart of a drive assist control.
Figure 9:
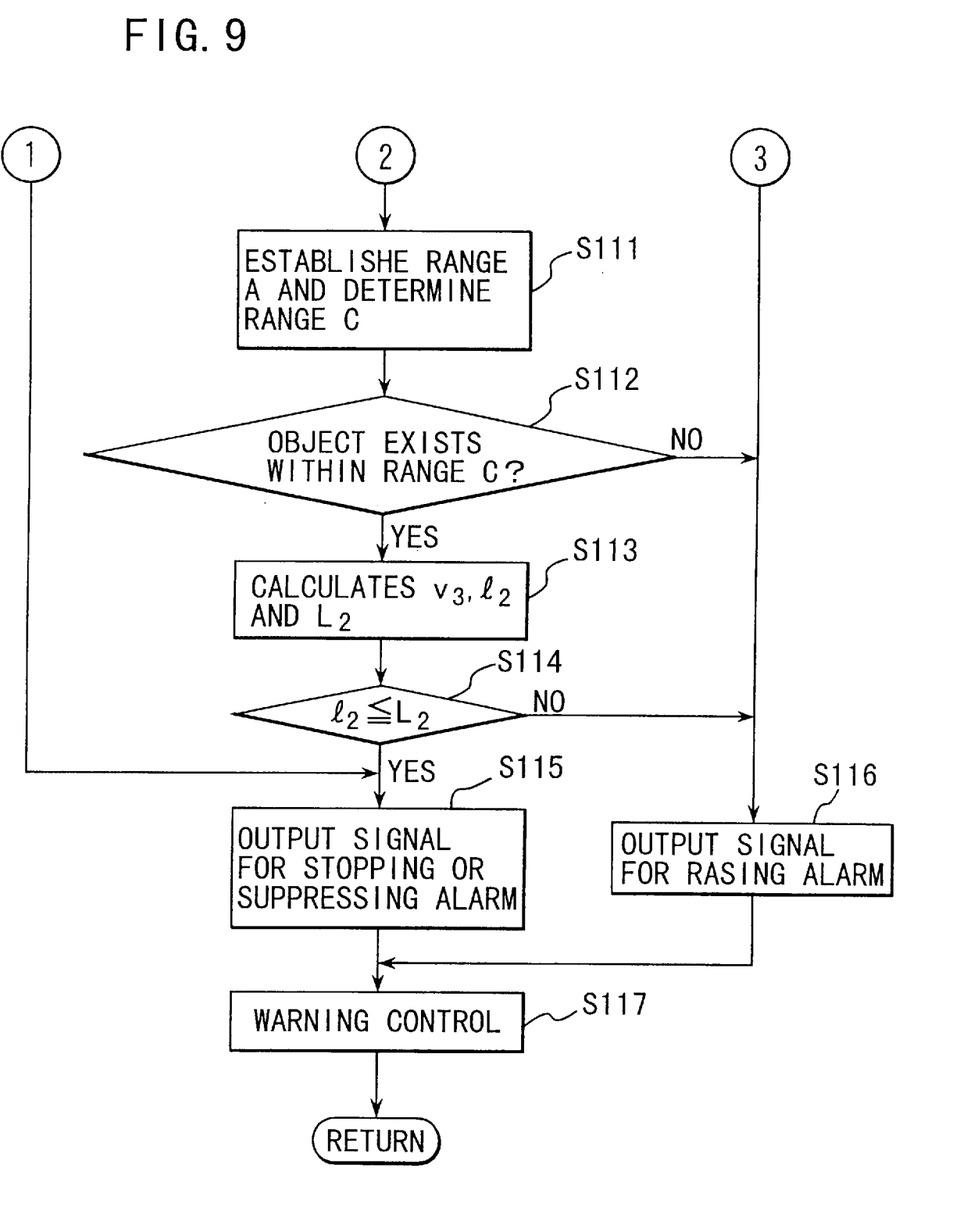
FIG. 9 is a flowchart continued from FIG. 8.

Next, the control of thus constituted drive assist system will be described using flowcharts shown in FIG. 8 and FIG. 9.

When the program starts, first at a step (hereinafter, referred to as "S") 101, the CCD camera optical system 3 images pictures in front of the self vehicle and produces distance images presenting three-dimensional distance distribution in the image processing section 4. Further, the vehicle speed sensor 5 detects a vehicle speed $v_1$ of the self vehicle 1.

Next, the program goes to S102 where the road/object detecting section 11 of the control apparatus 6 detects lanes, vehicles, objects other than vehicles and the like separately and obtains image data of roads (lanes) and objects on X-Y coordinates fixed to the self vehicle 1.

Then, the program steps to S103 where the position and the coordinates of the left and right lane markers $H_1$, $H_2$ of the self vehicle are detected, based on the image data from the road/object detecting section 11, with respect to a reference coordinate (0, 0) placed on the self vehicle 1. Then, the program goes to S104 where it is judged whether or not the self vehicle is moving out from the lane. If the self vehicle is not in the moving-out condition, the program skips to S115 where an signal for stopping or suppressing an alarm is outputted to the warning control section 14. These processes S103, S104 are ones performed in the lane moving-out judging section 12. On the other hand, if the self vehicle is in the moving-out condition, the program goes to S105 where the roadside judging section 13a of the warning signal generation judging section 13 judges whether or not there is a lane in the moving-out direction. If there is no lane in the moving-out direction (in case of a lane on the roadside), the program skips to S116 where a signal for raising an alarm is outputted to the warning control section 14.

On the other hand, if there is a lane in the moving-out direction, the program goes to S106 where it is judged whether or not an object (or objects) exists on the moving-out direction lane based on the data from the road/object detecting section 11. If no object is found, that is, sine there is no obstacle, the program skips to S109 and if an object (or objects) is found, the program steps to S107.

When the program goes to S107, a velocity $v_2$ of the object placed on the moving-out direction lane, an distance $l_1$ between that object and the self vehicle and an object judging distance $L_1$ are calculated and then the program goes to S108.

At S108, the object judging distance $L_1$ is compared with the distance $l_1$ and if the distance $l_1$ is smaller than the object judging distance $L_1$ ($l_1 \leq L_1$), in case where the self vehicle 1 enters into the moving-out direction lane, there is a possibility of colliding with the obstacle and consequently the program skips to S116 where an signal for raising an alarm is outputted to the warning control section 14.

On the other hand, if the distance $l_1$ is larger than the object judging distance $L_1$ ($l_1 > L_1$), the program goes to S109. Those steps S106, S107 are ones performed in the moving-out direction obstacle judging section 13b of the warning signal generation judging section 13.

When the program goes from S106 or S108 to S109, a width "B" of the self lane is calculated based on data from the road/object detecting section 11 and after that the program goes to S110 where the width "B" of the self lane is compared with a predetermined width "$B_{cl}$".

At S110, if the width "B" of the self lane is smaller than the predetermined width "$B_{cl}$" (B<Bcl), the lane moving-out is judged to be unavoidable due to the narrow width of the lane and the program skips to S115 where a signal for stopping or suppressing an alarm is outputted to the warning control section 14. On the other hand, at S110, if the width "B" of the self lane is larger than the predetermined width "$B_{cl}$" (B$\geq$B$_{cl}$), the program goes to S111. The steps S109, S110 are ones performed in the lane width judging section 13c of the warning signal generation judging section 13.

When the program goes to S111, detecting ranges "A" (respective detecting ranges along the left and right neighboring lanes) are established based on data from the road/object detecting section 11 and data from the vehicle speed sensor 5 and an overall detecting range "C", including the lane width "B" and the left and right detecting ranges "A", is determined.

After that, the program goes to S112 where it is judged whether or not an object (or objects) exists within the overall detecting range "C" based on the data from the road/object detecting section 11. If there is no object within the range "C", that is, no obstacle exists in the frontal direction of the vehicle, since it is judged that the vehicle has tried a mere lane moving-out, the program skips to S116 where a signal for raising an alarm is outputted to the warning control section 14.

At S112, if there is an object (objects) within the range "C", the program steps to S113 where a velocity $v_3$ of the detected object, a distance $l_2$ between the detected object and the self vehicle 1 and an obstacle judging distance L2 are calculated, based on data from the road/object detecting section 11 and data from the vehicle speed sensor 5.

Then, the program goes to S114 where the obstacle judging distance $L_2$ is compared with the distance $l_2$ between the object and the vehicle. If the distance $l_2$ is smaller than the obstacle judging distance $L_2$ ($l_2 \leq L_2$), since it is judged that this lane moving-out is an intentional behavior to avoid the obstacle, the program goes to S115 in which a signal for stopping or suppressing an alarm is outputted to the warning control section 14.

On the other hand, at S114, if the distance $l_2$ is larger than the obstacle judging distance $L_2$ ($l_2 > L_2$), since it is judged that this is a mere lane moving-out, the program goes to S116 where a signal for raising an alarm is outputted to the warning control section 14. That is, steps S111, S112, S113, S114 are ones performed in the front direction obstacle judging section 13d of the warning signal generation judging section 13.

After a signal for stopping or suppressing an alarm is outputted to the warning control section 14 at S115 or a signal for raising an alarm is outputted to the warning control section 14 at S116, the program goes to S117 where the warning control section 14 operates the warning device 7.

Thus, the drive assist system according to the embodiment of the present invention can call a driver's attention by raising an alarm when the self vehicle moves out from the lane in the roadside direction. Further, in case where the vehicle tries to enter a neighboring lane, the drive assist system can call a driver's attention by raising an alarm when there is a possibility of colliding with an obstacle such as an oncoming vehicle. Further, in case where the vehicle moves out from the lane unavoidably due to the narrow width of the lane, the drive assist system can stop or suppress an alarm. Further, in case where the vehicle moves out from the lane to avoid an obstacle existing in front of the vehicle, the drive assist system can stop or suppress an alarm.

The warning device according to the embodiment of the present invention may include any kind of warning devices such as a buzzer, a warning light, a display, an announcing device and the like. Further, in addition to the warning device, an automatic brake system capable of braking automatically may be utilized.

As described hereinbefore, according to the present invention, in raising an lane moving-out alarm, since it is judged properly whether an alarm is really required or an alarm is to be stopped or suppressed, the drive assist system can have a lane moving-out warning function having a natural feeling and capable of reflecting a driver's intention.

While the presently preferred embodiment of the present invention has been shown and described, it is to be understood that this disclosure is for the purpose of illustration and that various changes and modifications may be made without departing from the scope of the invention as set forth in the appended claim.

What is claimed is:

1. A drive assist system for raising an alarm when a self vehicle moves out from a self lane on which said self vehicle travels, comprising:

a running environment detecting means for detecting running conditions of said self vehicle, a position of said self vehicle, a position of said self lane and a position of a neighboring lane and for recognizing objects existing on said self lane and said neighboring lane in the relationship with said position of said self vehicle;

a lane moving-out judging means based on information obtained from said running environment detecting means for comparing said position of said self vehicle with said position of said self lane and for judging a lane moving-out from said self lane of said self vehicle;

a warning signal generation judging means for outputting a signal to stop or suppress an alarm when said self vehicle moves out from said self lane and at least when it is judged based on said information obtained from said running environment judging section that an object exists on said self lane within a preestablished range and that said object is an obstacle to said self vehicle; and a warning control means for operating a warning device based on said signal from said warning signal generation judging means;

wherein said preestablished range in said warning signal generation judging means includes a width of said self lane and a specified width of a range provided on left and right sides of said self lane, respectively.

2. A drive assist system for raising an alarm when a self vehicle moves out from a self lane on which said self vehicle travels, comprising:

a running environment detecting means for detecting running conditions of said self vehicle, a position of said self vehicle, a position of said self lane and a position of a neighboring lane and for recognizing objects existing on said self lane and said neighboring lane in the relationship with said position of said self vehicle;

a lane moving-out judging means based on information obtained from said running environment detecting means for comparing said position of said self vehicle with said position of said self lane and for judging a lane moving-out from said self lane of said self vehicle;

a warning signal generation judging means for outputting a signal to stop or suppress an alarm when said self vehicle moves out from said self lane and at least when it is judged based on said information obtained from said running environment judging means that a width of said self lane is narrower than a predetermined value; and a warning control means for operating an warning device based on said signal from said warning signal generation judging means.

3. The drive assist system according to claim 2, wherein said running environment detecting means comprises a pair of CCD cameras mounted on the vehicle.

4. The drive assist system according to claim 2, wherein said warning device comprises a device selected from the group consisting of: a buzzer, a warning lamp, a display guidance, an audio announce generating device, and an automatic brake apparatus.

5. A driving assist system for a vehicle, comprising:

a pair of image pick-up devices mounted on the vehicle for taking a stereoscopic picture of the object in front of the vehicle, said image pick-up devices generating an image signal;

object distinguishing means for processing said image signal by means of the principle of triangulation and generating a distance image signal representing a three-dimensional distance distribution about all of the images of the objects;

a vehicle speed sensor mounted on the vehicle for detecting a vehicle speed and producing a vehicle speed signal;

object recognition means responsive to said distance image signal for detecting coordinates of roads and objects separately, said object recognition means producing an object signal;

lane deviation judging means responsive to said object signal for determining whether the vehicle is running within a desired lane, said lane deviation judging means outputting a deviation signal;

road side judging means responsive to said deviation signal and said object signal for discriminating whether or not there is a neighboring lane beside the self lane, said road side judging means producing a lane signal when another lane to enter exists; and warning means responsive to said lane signal and said deviation signal for warning a driver when said lane signal is unrecognized.

6. The driving assist system according to claim 5, wherein said image pick-up device comprises a pair of CCD cameras mounted on the vehicle.

7. The driving system according to claim 5, wherein the warning device comprises a device selected from the group consisting of: a buzzer, a warning lamp, a display guidance, an audio announce generating device, and an automatic brake apparatus.

8. A driving assist system for a vehicle, comprising:

a pair of image pick-up devices mounted on the vehicle for taking a stereoscopic picture of the object in front of the vehicle, said image pick-up devices generating an image signal;

a vehicle speed sensor mounted on the vehicle for detecting a vehicle speed and producing a vehicle speed signal;

object distinguishing means responsive to said image signal for processing said image signal by means of the principle of triangulation and a three-dimensional distribution of the object and for deriving an object information about the object, said object distinguishing means generating an object signal;

recognized object judging means responsive to said object signal for deriving various parameters of a position and a shape of the object, said recognized object judging means outputting a deviation signal distinguishing a deviation from a lane and a road side along the lane;

obstacle judging means responsive to said vehicle speed signal, said object signal and said deviation signal for determining whether the object on a neighboring lane comes to be an obstacle for the vehicle on the basis of said derived parameters of the object, said obstacle judging means producing a side judgment signal when the vehicle is going to enter the neighboring lane; and warning control means responsive to said side judgment signal and said deviation signal for distinguishing a deviation from a lane and an existence of a neighboring lane, said warning control means outputting a warning signal only when the vehicle is going into a dangerous situation due to an existence of the obstacle object in the neighboring lane.

9. The driving assist system according to claim 8, wherein said image pick-up device comprises a pair of CCD cameras mounted on the vehicle.

10. The driving system according to claim 8, wherein the warning device comprises a device selected from the group consisting of: a buzzer, a warning lamp, a display guidance, an audio announce generating device, and an automatic brake apparatus.

11. A driving assist system for a vehicle, comprising:
a pair of image pick-up devices mounted on the vehicle for taking a stereoscopic picture of the object in front of the vehicle, said image pick-up devices generating an image signal;
a vehicle speed sensor mounted on the vehicle for detecting a vehicle speed and producing a vehicle speed signal;
object distinguishing means responsive to said image signal for processing said image signal by means of the principle of triangulation and a three-dimensional distribution of the object and for deriving an object information about said object, said object distinguishing means generating an object signal;
recognized object judging means responsive to said object signal for deriving various parameters of a position and a shape of the object and distinguishing a deviation from a lane and a road side along the lane, said recognized object judging means outputting a deviation signal;
obstacle judging means responsive to said speed signal, said object signal and said deviation signal for determining whether the object in a neighboring lane becomes an obstacle for the vehicle on the basis of said derived parameters of the object, said obstacle judging means producing a side judgment signal when the obstacle object is unrecognized;
self lane width judging means responsive to said object signal and said side judgment signal for determining whether or not a width of said lane is narrower than a predetermined width, said self lane width judging means producing a width signal only when said width is smaller than said predetermined width; and
warning suppressing means responsive to said width signal for restricting a generation of a warning signal even when the vehicle is treading on a lane.

12. The driving assist system according to claim 11, wherein said image pick-up device comprises a pair of CCD cameras mounted on the vehicle.

13. The driving system according to claim 11, wherein the warning device comprises a device selected from the group consisting of: a buzzer, a warning lamp, a display guidance, an audio announce generating device, and an automatic brake apparatus.

14. A driving assist system for a vehicle, comprising:
a pair of image pick-up devices mounted on the vehicle for taking a stereoscopic picture of the object in front of the vehicle, said image pick-up devices generating an image signal;
a vehicle speed sensor mounted on the vehicle for detecting a vehicle speed and producing a vehicle speed signal;
object distinguishing means responsive to said image signal for processing said image signal by means of the principle of triangulation and a three-dimensional distribution of the object and for deriving an object information about said object, said object distinguishing means generating an object signal;
recognized object judging means responsive to said object signal for deriving various parameters of a position and a shape of the object, said recognized object judging means outputting a deviation signal distinguishing a deviation from a lane and a road side along the lane;
said obstacle judging means responsive to said vehicle speed signal, said object signal and said deviation signal for determining whether the object on a neighboring lane comes to be a side obstacle for the vehicle on the basis of said parameters of the object, said side obstacle judging means producing a side obstacle judgment signal when said side obstacle is unrecognized;
self lane width judging means responsive to said object signal and said side obstacle signal for determining whether a width of said lane is narrower than a predetermined width, said self lane width judging means producing a width signal only when said width is smaller than said predetermined width;
front obstacle judging means responsive to said speed signal, said object signal and said width signal for determining whether the object on a neighboring lane comes to be a front obstacle for the vehicle on the basis of said parameters of the object, said front obstacle judging means producing at least a front obstacle signal when the front obstacle is unrecognized; and
warning suppressing means responsive to said front obstacle signal for restricting a generation of a warning even when the vehicle is treading on a lane.

15. The driving assist system according to claim 14, wherein said image pick-up device comprises a pair of CCD cameras mounted on the vehicle.

16. The driving system according to claim 14, wherein the warning device comprises a device selected from the group consisting of: a buzzer, a warning lamp, a display guidance, an audio announce generating device, and an automatic brake apparatus.

17. A method of assisting a driving of a vehicle, comprising:
taking a stereoscopic picture of an object in front of the vehicle and generating an image signal;
processing said image signal by means of the principle of triangulation and generating a distance image signal representing a three-dimensional distance distribution about all of the images of the objects;

detecting a vehicle speed;

detecting coordinates of roads and objects separately responsive to said distance image signal and producing an object signal;

determining, responsive to said object signal, whether the vehicle is running within a desired lane or not, and outputting a deviation signal;

discriminating, responsive to said deviation signal and said object signal, whether or not a neighboring lane exists besides the desired lane, and producing a lane signal when another lane to enter exists; and warning a driver when said lane signal is unrecognized responsive to said lane signal and said deviation signal.

18. A method of assisting a driving of a vehicle, comprising:

taking a stereoscopic picture of the object in front of the vehicle and generating an image signal;

detecting a vehicle speed and producing a vehicle speed signal;

processing said image signal by means of the principle of triangulation and a three-dimensional distribution of the object and for deriving an object information about the object, and generating an object signal;

deriving various parameters of a position and a shape of the object responsive to said object signal and outputting a deviation signal distinguishing a deviation from a lane and a road side therealong;

determining, responsive to said vehicle speed signal, whether the object on a neighboring lane comes to be an obstacle for the vehicle on the basis of said derived parameters of the object, and producing a side judgment signal when the vehicle is going to enter the neighboring lane; and distinguishing, responsive to said side judgment signal and said deviation signal, a deviation from a lane and an existence of a neighboring lane, said warning control means outputting a warning signal only when the vehicle is going into a dangerous situation due to an existence of the obstacle object on the neighboring lane.

19. A method of assisting a driving of a vehicle, comprising:

taking a stereoscopic picture of the object in front of the vehicle and generating an image signal;

detecting a vehicle speed and producing a vehicle speed signal;

processing said image signal by means of the principle of triangulation and a three-dimensional distribution of the object and for deriving an object information about the object, and generating an object signal;

deriving, responsive to said object signal, various parameters of a position and a shape of the object and distinguishing a deviation from a lane and a road side therealong, and outputting a deviation signal;

determining, responsive to said speed signal, whether the object on a neighboring lane comes to be an obstacle for said vehicle on the basis of said parameters of the object, and producing a side judgment signal when the obstacle object is unrecognized;

determining, responsive to said object signal and said side judgment signal, whether or not a width of said lane is narrower than a predetermined width, and producing a width signal only when said width is smaller than said predetermined width; and restricting a generation of a warning signal even when the vehicle is treading on a lane responsive to said width signal.

20. A method of assisting a driving of a vehicle, comprising:

taking a stereoscopic picture of the object in front of the vehicle and generating an image signal;

detecting a vehicle speed and producing a vehicle speed signal;

processing said image signal by means of the principle of triangulation and a three-dimensional distribution of the object and deriving an object information about the object, and generating an object signal;

deriving, responsive to said object signal, various parameters of a position and a shape of the object, and outputting a deviation signal distinguishing a deviation from a lane and a road side therealong;

determining, responsive to said vehicle speed signal, whether the object on a neighboring lane comes to be a side obstacle for the vehicle on the basis of said parameters of the object, and producing a side obstacle judgment signal when said side obstacle is unrecognized;

determining, responsive to said object signal and said side obstacle signal, whether a width of said lane is narrower than a predetermined width, and producing a width signal only when said width is smaller than said predetermined width;

determining, responsive to said speed signal, whether the object on a neighboring lane comes to be a front obstacle for the vehicle on the basis of said parameters of the object, and producing at least a front obstacle signal when the front obstacle is unrecognized; and restricting a generation of a warning even when the vehicle is treading on a lane responsive to said front obstacle signal.

21. A driving assist system mounted on a vehicle for recognizing an object therearound having a pair of cameras mounted on both left and right sides of said vehicle for taking a stereoscopic picture of an object and for generating an image signal and a vehicle speed sensor mounted on said vehicle for detecting a vehicle speed and for producing a vehicle speed signal, comprising:

an object distinguishing means responsive to said image signal for generating a distance image representing a three-dimensional distance distribution among all images by processing said image signal through a principle of triangulation and for generating a distance image signal;

an object recognition means responsive to said distance image signal for detecting coordinates of roads and objects separately and for producing an object signal;

a lane deviation judging means responsive to said object signal for determining whether said vehicle is running within a desired lane or not and for outputting a deviation signal;

a road side judging means responsive to said deviation signal and said object signal for discriminating whether or not there is a neighboring lane beside said desired lane and for producing a lane signal if there is another lane to enter; and a warning means responsive to said lane signal for warning a driver if said lane signal is unrecognized so as to effectively enable safe driving.

22. The drive assist system according to claim 21, wherein said warning means comprises a device selected from the group of consisting of: a buzzer, a warning lamp, a display guidance, an audio announce generating device, and an automatic brake apparatus.

23. A driving assist system mounted on a vehicle for recognizing an object therearound having a pair of cameras mounted on both left and right sides of said vehicle for taking a stereoscopic picture of an object in front of said vehicle and for generating an image signal and a vehicle speed sensor mounted on said vehicle for detecting a vehicle speed and for producing a vehicle speed signal, comprising:

an object distinguishing means responsive to said image signal for generating a distance image representing a three-dimensional distance distribution among all images by processing said image signal through a principle of triangulation and for generating a distance image signal;

a recognized object judging means responsive to said object signal for deriving various parameters of a position and a shape of said object in order to distinguish a deviation from a lane and a road side therealong and for outputting a deviation signal;

an obstacle judging means responsive to said speed signal, said object signal and said deviation signal for determining whether or not said object on a neighboring lane becomes an obstacle for said vehicle on the basis of said parameters and for producing a side judgement signal when said vehicle is going to enter said neighboring lane; and     a warning means responsive to said object signal and said deviation signal for distinguishing a deviation from a lane and an existence of a neighboring lane and for outputting a warning signal only if said vehicle is going into a dangerous situation due to the presence of said obstacle on said neighboring lane so as to avoid said vehicle from colliding with said obstacle and to effectively enable safe driving.

24. The drive assist system according to claim 23, wherein said warning means comprises a device selected from the group of consisting of: a buzzer, a warning lamp, a display guidance, an audio announce generating device, and an automatic brake apparatus.

25. A driving assist system mounted on a vehicle for recognizing an object therearound having a pair of cameras mounted on both left and right sides of said vehicle for taking a stereoscopic picture of an object in front of said vehicle and for generating an image signal and a vehicle speed sensor mounted on said vehicle for detecting a vehicle speed and for producing a vehicle speed signal, comprising:

an object distinguishing means responsive to said image signal for generating a distance image representing a three-dimensional distance distribution among all images by processing said image signal through a principle of triangulation and for generating a distance image signal;

a recognized object judging means responsive to said object signal for deriving various parameters of a position and a shape of said object in order to distinguish a deviation from a lane and a road side therealong and for outputting a deviation signal;

a side obstacle judging means responsive to said speed signal, said object signal and said deviation signal for determining whether or not said object on a neighboring lane becomes a side obstacle for said vehicle on the basis of said parameters and for producing a side obstacle judgement signal if when said side obstacle is unrecognized;

a self lane width judging means responsive to said object signal and said side obstacle signal for determining whether or not a width of said lane is narrower than a predetermined width and for producing a width signal only when said width is narrower than said predetermined width;

a front obstacle judging means responsive to said speed signal, said object signal and said width signal for determining whether or not said object on a neighboring lane becomes a front obstacle for said vehicle on the basis of said parameters and for producing at least a front obstacle signal if when said front obstacle is recognized; and     a warning suppressing means responsive to said front obstacle signal for restricting a warning generation even when said vehicle is treading on a lane so as to avoid a driver from hearing an unnecessary warning and to effectively enable safe driving.

26. The drive assist system according to claim 25, wherein said warning means comprises a device selected from the group of consisting of: a buzzer, a warning lamp, a display guidance, an audio announce generating device, and an automatic brake apparatus.

\* \* \* \* \*